United States Patent
Ponnuru et al.

(10) Patent No.: US 12,470,385 B2
(45) Date of Patent: Nov. 11, 2025

(54) SYSTEMS AND METHODS TO ADVERTISE SPDM COMMAND TIMING REQUIREMENTS

(71) Applicant: Dell Products, L.P., Round Rock, TX (US)

(72) Inventors: Viswanath Ponnuru, Bangalore (IN); Chandrashekar Nelogal, Round Rock, TX (US); Vineeth Radhakrishnan, Palakkad (IN); Dharma Bhushan Ramaiah, Bangalore (IN); Mini Thottunkal Thankappan, Bangalore (IN); Rama Rao Bisa, Bangalore (IN); Shinose Abdul Rahiman, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 251 days.

(21) Appl. No.: 18/181,686

(22) Filed: Mar. 10, 2023

(65) Prior Publication Data

US 2024/0305460 A1    Sep. 12, 2024

(51) Int. Cl.
H04L 9/32    (2006.01)
G06F 9/445    (2018.01)

(52) U.S. Cl.
CPC ............ *H04L 9/32* (2013.01); *G06F 9/44536* (2013.01)

(58) Field of Classification Search
CPC .............................. H04L 9/32; G06F 9/44536
See application file for complete search history.

(56) References Cited

U.S. PATENT DOCUMENTS

| | | | |
|---|---|---|---|
| 2021/0367974 A1* | 11/2021 | Ponnuru | H04L 63/0823 |
| 2023/0025979 A1* | 1/2023 | Bolen | G06F 21/44 |
| 2024/0028685 A1* | 1/2024 | Taveira | G06F 21/33 |
| 2024/0281538 A1* | 8/2024 | Radhakrishnan | G06F 21/57 |

* cited by examiner

*Primary Examiner* — Abiy Getachew
(74) *Attorney, Agent, or Firm* — Fogarty LLP

(57) ABSTRACT

According to embodiments of the present disclosure, systems and methods to advertise Security Protocol and Data Model (SPDM) command timing requirements are provided. According to one embodiment, an Information Handling System (IHS) includes a requester and a responder conforming to a SPDM specification in which the responder is configured with computer-executable logic to, in response to a request from a requester, generate an estimated amount of time to process a SPDM command, and send the estimated amount of time to the requester in response to the request. The requester may then wait the estimated amount of time between sending each of multiple ensuing commands to the responder.

20 Claims, 3 Drawing Sheets

300

```
SPDM COMMAND PROCESSING TIME TABLE IN
US (MICRO SECS.)
   302A    302B      302C
    |       |         |
    v       v         v
CODE  | AVG. TIME  | MAX. TIME
-------------------------------
0X83  | 0.3        | 0.5
0X82  | 1.6        | 2.8
0XEE  | 75.9       | 97.6
```

SYSTEMS AND METHODS TO ADVERTISE SPDM COMMAND TIMING REQUIREMENTS

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

SPDM-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight and high levels of trust provided thereby.

SUMMARY

According to embodiments of the present disclosure, systems and methods to advertise Security Protocol and Data Model (SPDM) command timing requirements are provided. According to one embodiment, an Information Handling System (IHS) includes a requester and a responder conforming to a SPDM specification in which the responder is configured with computer-executable logic to, in response to a request from a requester, generate an estimated amount of time to process a SPDM command, and send the estimated amount of time to the requester in response to the request. The requester may then wait the estimated amount of time between sending each of multiple ensuing commands to the responder.

According to another embodiment, a SPDM command timing requirement method includes the steps of generating, by a responder, an estimated amount of time to process a SPDM command when received from the requester, sending the estimated amount of time to the requester in response to the request, and waiting the estimated amount of time between sending each of a plurality of the commands to the responder. Wherein the responder and the requester function according to the SPDM specification.

According to yet another embodiment, an Information Handling System (IHS) includes a requester that conforms to the SPDM specification. The requester includes computer-executable instructions that, when executed by a processor of the IHS, cause the IHS to send a request to generate an estimated amount of time to process a SPDM command to a responder, receive the estimated amount of time from the responder in response to the request, and after sending the command to the responder, wait the estimated amount of time before sending each of a plurality of the commands to the responder.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
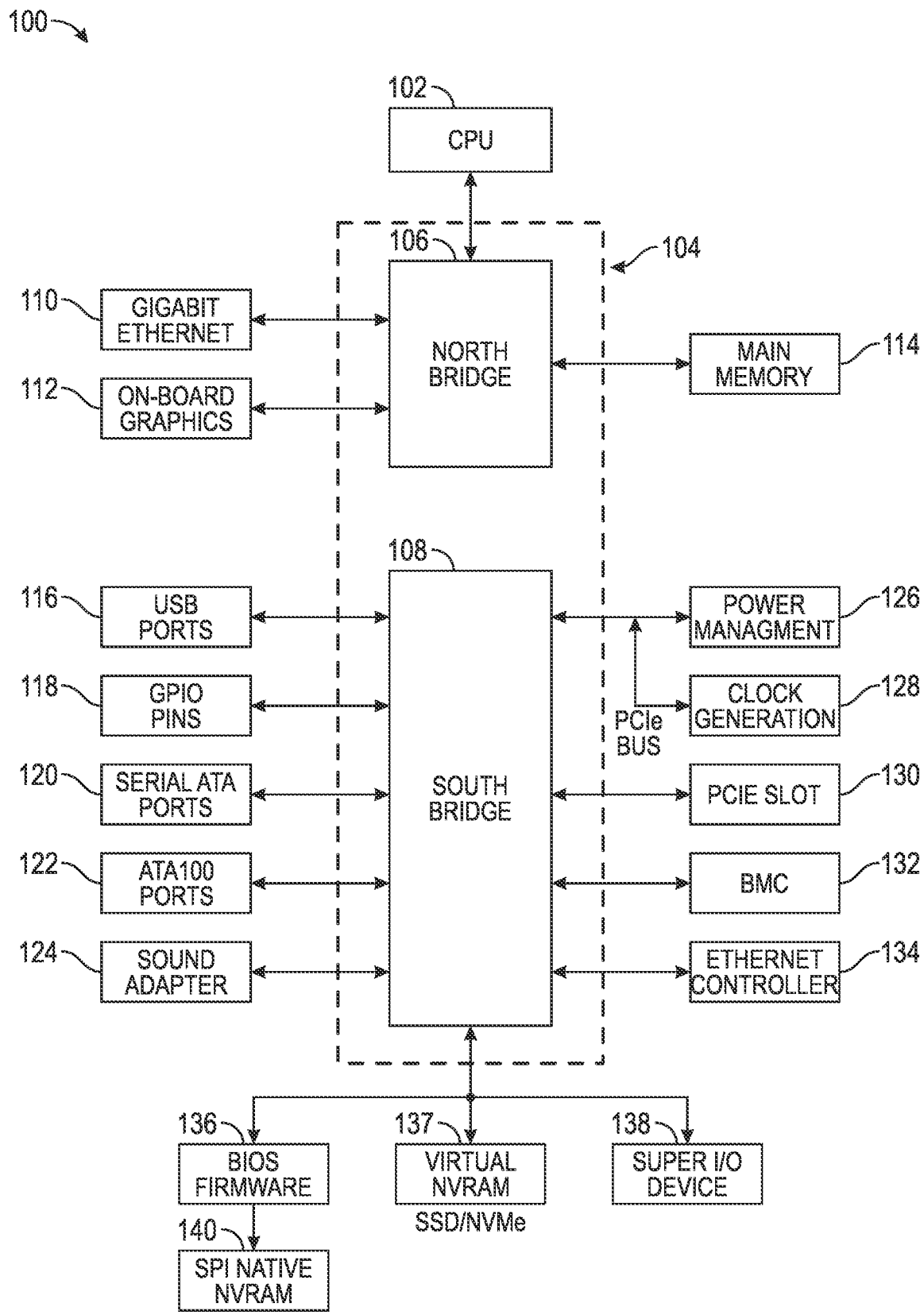
FIG. 1 shows an example of an Information Handling System (IHS) that may be configured to implement a system and method for advertising Security Protocol and Data Model (SPDM) command timing requirements according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with Baseboard Management Controllers (BMCs) that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which support peer-to-peer messaging (e.g., route by ID), and allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

The DMTF and SPDM specifications define timing requirements for cryptographic-based operations and non-cryptographic-based operations that the requesters and responders must complete the transaction. Cryptographic-based operations typically include those operations that involve generating and processing cryptographic functions, while non-cryptographic-based operations typically do not involve generating and processing cryptographic functions. Generally speaking, cryptographic-based operations require longer times to process because they are often computationally intensive. If a requester (e.g., an entity that sends commands to a responder) does not receive a response within a first time period T1 (e.g., the time allotted that the requester shall wait before issuing a retry for requests that do not require cryptographic-based processing), or a second time period T2 (e.g., the time allotted that the requester shall wait before issuing a retry for requests that do involve cryptographic-based processing), the requester can retry a request message. SPDM specifies that a retry of a request message shall be a complete re-transmission of the original SPDM request message. From the perspective of a requester, a retry of a request message is the re-transmission of the original SPDM request one or more times in succession directly following the transmission of the original SPDM request. From the perspective of a responder, a retry of a request message is the reception of the same SPDM request one or more times in succession assuming the transport receives messages in order.

Conventionally, the existing timing requirements provide limited capabilities associated with checking a command processing status. The request message shall ask for the response to the original request upon receipt of a "ResponseNotReady" error code as specified by SPDM. Drawbacks associated with the existing timing requirements may include that the SPDM responder must provide a response within a fixed time of 100 milli-seconds (e.g., response time is statically set) for non-cryptographic-based processing commands, such as a "GET_VERSION-CAPABILITIES-ALGORITHMS" command). Using current SPDM techniques, the requester is not made aware of any average or minimum amount of command processing time apriori for non-cryptographic-based operations. Similarly, the requester is not made aware of any cryptographic-based processing average or minimum completion timing requirements.

According to embodiments of the present disclosure, a mechanism is provided that advertises the minimum time for processing SPDM commands per connection based on apriori knowledge so that SPDM requester can make intelligent decisions before sending a next set of similar SPDM commands in subsequent sessions in an efficient manner as will be described in detail herein below.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS 100 (e.g., a remotely located IHS 100) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in one embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more SPDM-enabled devices 202 configured in the IHS 100. The SPDM-enabled device 202 may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
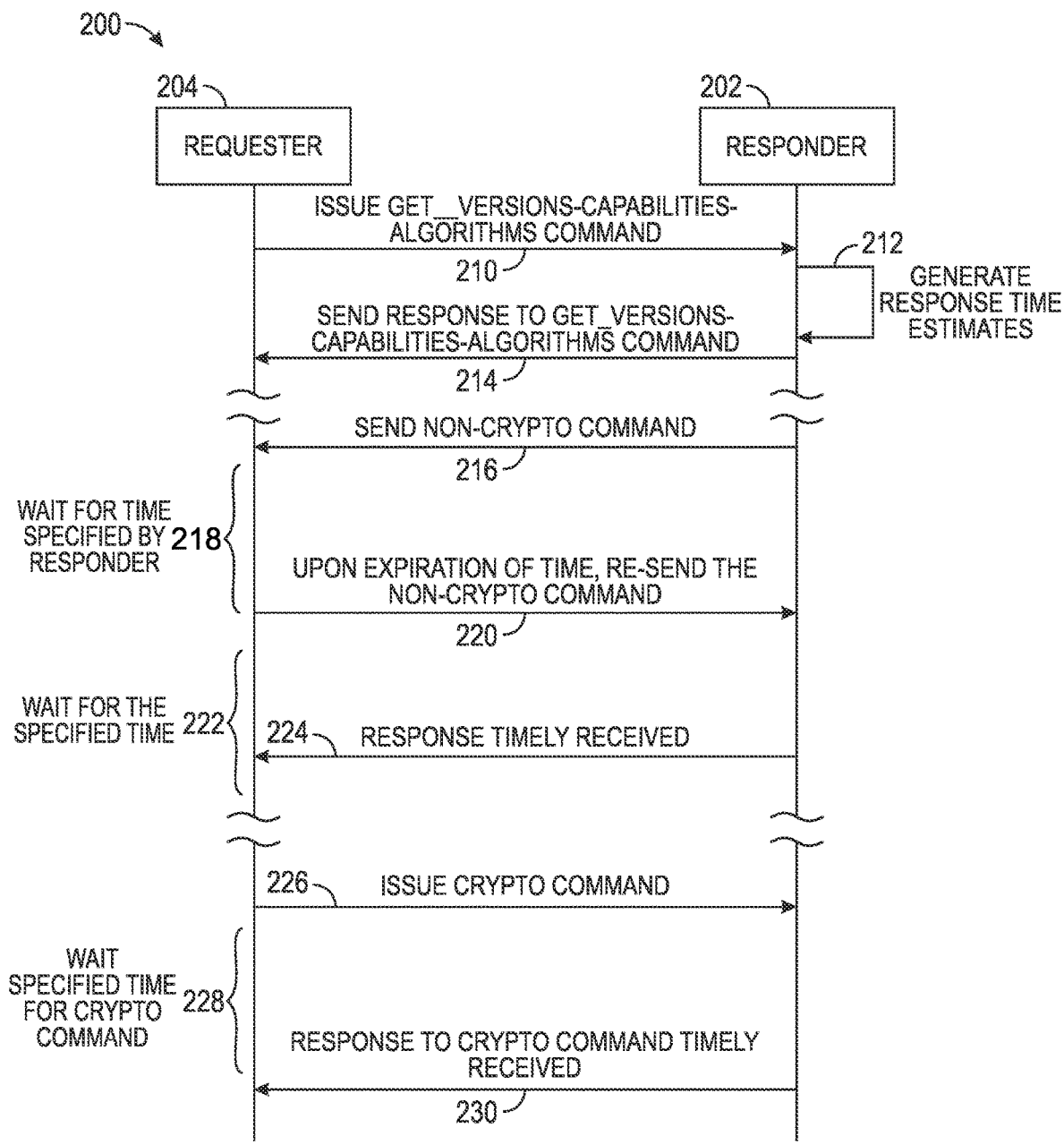
FIG. 2 illustrates a flow diagram showing an example SPDM command timing requirements method that may be used to advertise an estimated response time so that a requester can make intelligent decisions regarding when to send commands to the responder according to one embodiment of the present disclosure.

FIG. 2 illustrates a flow diagram showing an example SPDM command timing requirements method 200 that may be used to advertise, by a responder, an estimated response time so that a requester 204 can make intelligent decisions regarding when to send commands to the responder 202 according to one embodiment of the present disclosure. The SPDM timing requirements method 200 may be performed at any suitable time. In one embodiment, the SPDM timing requirements method 200 may be performed each time the requester 204 and/or responder 202 is re-booted. In a particular embodiment in which the responder 202 is a SPDM-enabled device configured in an IHS 100, and the requester 204 is a BMC 132 configured in the IHS 100, the SPDM timing requirements method 200 may be performed each time the IHS 100 is re-booted.

The responder 202 and requester 204 may include any type of components that conform to the SPDM specification. In one embodiment, the requester 204 may be a BMC 132, while the responder 202 may be a SPDM-enabled device configured in an IHS 100, such as described herein above. Embodiments of the present disclosure may be particularly useful for BMCs 132 that manage SPDM-enabled devices in IHSs 100 in that each of those devices may possess different processing capabilities, thus having varied limitations when functioning in a SPDM protocol. As such, the BMC 132 may be well suited to optimally utilizing each different SPDM-enabled device at its optimal operating characteristics by providing apriori information about its estimated response time from each of the SPDM-enabled devices managed by the BMC 132.

While the SPDM timing requirements method 200 is described above as being configured with a single responder 202 and a single requester 204, it should be understood that the SPDM timing requirements method 200 may be configured with any number of the responders 202 and any number of requesters 204 without departing from the spirit and scope of the present disclosure.

Initially at step 210, the requester 204 issues a "GET_VERSION-CAPABILITIES-ALGORITHMS" SPDM command to the responder 202. The responder 202 is configured with executable logic to, upon receipt of the "GET_VERSION-CAPABILITIES-ALGORITHMS" command, generate a response time estimate for responding to future commands from the requester 204 at step 212. In one embodiment, the responder 202 may generate response time estimates for different types of commands. For example, the responder 202 may generate a response time estimate for non-cryptographic-based commands, and another different response time estimate for cryptographic-based commands.

Figures 3, 4:
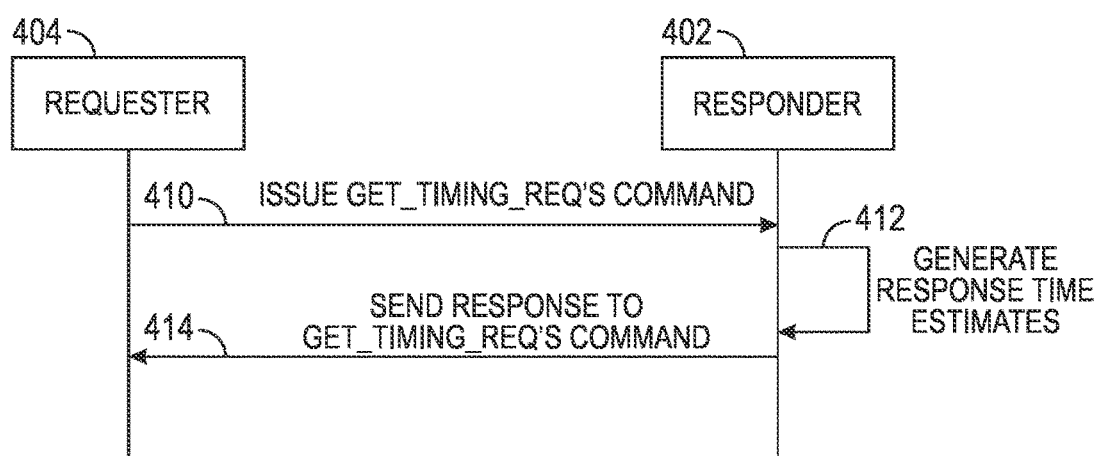
FIG. 3 illustrates an example table that may be generated by the responder to cache the response time estimates according to one embodiment of the present disclosure.
FIG. 4 illustrates a flow diagram showing another example SPDM command timing requirements method that may be used to advertise an estimated response time so that a requester can make intelligent decisions when sending commands to the responder according to one embodiment of the present disclosure.

FIG. 3 illustrates an example table 300 that may be generated by the responder 202 to cache the response time estimates generated by the responder 202. The table 300 includes a command code column 302a, an estimated average time column 302b, and an estimated max time column 302c for each of multiple different types of command codes as designated in the code column 302a. In the particular example table 300 shown, all values are in micro-seconds; nevertheless in other embodiments, the values may have any suitable structure. For example, the responder 202 may generate a response time estimate for command code "0x83" (which is a non-cryptographic-based command) with an average time of 0.3 micro-seconds, and a maximum time of 0.5 micro-seconds. The responder 202 may also generate a response time estimate for command code "0x82" (which is another non-cryptographic-based command) with an average time of 1.6 micro-seconds, and a maximum time of 2.8 micro-seconds. The responder 202 may also generate a response time estimate for command code "0xEE" (which is a cryptographic-based command) with an average time of 75.9 micro-seconds, and a maximum time of 97.6 micro-seconds. Thus, the table 300 may be populated with values for each of different types of SPDM-based commands.

In one embodiment, the responder 202 may generate new response time estimates whenever its computing load profile (e.g., process loading, storage loading, network congestion, etc.) changes above a certain predetermined threshold value. For example, if an application running on the IHS 100 causes a process loading on the responder 202 to increase from 20 percent (%) to 60 percent (%), the responder 202 may be triggered into re-generating the response time estimates, populating the table 300 with those newly estimated values, and unilaterally sending the table 300 to the requester 204, which in one embodiment, is a BMC 132.

Referring again to FIG. 2, once the table 300 has been generated, it may be sent to the requester 204 in the response to the "GET_VERSION-CAPABILITIES-ALGORITHMS" command at step 214. At this point, the requester 204 now possesses apriori knowledge of the response time characteristics of the responder 202, and it can now make intelligent decisions about the timing of commands sent to the responder 202.

At some later point in time at step 216, the requester 204 issues a non-cryptographic-based command to the responder 202. Because the requester 204 has apriori knowledge about when to expect a response to the non-cryptographic-based command, it waits for that amount of time at step 218. Because as shown in the example embodiment, a response has not been received upon expiration of the wait time, the requester 204 re-sends the non-cryptographic-based command to the responder 202 at step 220, and again waits for the specified time at step 222. In response to issuance of the second non-cryptographic-based command, however, the responder 202 responds within the specified wait time at step 224 and thus, the requester 204 no longer needs to re-send any additional non-cryptographic-based commands that are associated with the first non-cryptographic-based command initially sent at step 216.

Later on at step 226, the requester 204 issues a cryptographic-based command to the responder 202, and begins waiting at step 228. Because the cryptographic-based command is more computationally intensive relative to the non-cryptographic-based commands, the wait time is longer. Nevertheless, in the present example case, a response to the cryptographic-based command is received within the time window at step 230, and thus the requester 204 no longer needs to re-send any additional cryptographic-based commands that are associated with the first cryptographic-based command initially sent at step 226.

The SPDM timing requirements method 200 may be continued to process other commands sent from the requester 204 to the responder 202. Nevertheless, when use of the SPDM timing requirements system and method 200 are no longer needed or desired, the process ends.

FIG. 4 illustrates a flow diagram showing another example SPDM command timing requirements method 400 that may be used to advertise, by a responder 402, an estimated response time so that a requester 404 can make intelligent decisions when sending commands to the responder 402 according to one embodiment of the present disclosure. The requestor 404 and responder 402 may be similar in design and construction to the requester 204 and responder 202 of FIG. 2. The requester 404 and responder 402 are both different in that the requester 404 is configured with executable logic to generate and send a new SPDM command, namely a "GET_TIMING_REQUIREMENTS" command, which when received by the responder 402, causes its executable logic to generate response time estimates, and send the generated response time estimates to the requester 404 as will be described in detail herein below. That is, the "GET_TIMING_REQUIREMENTS" command may be a SPDM command dedicated to obtaining estimated amount of time from the responder.

Initially at step 410, the requester 404 generates the "GET_TIMING_REQUIREMENTS" command and sends it to the responder 402. Receipt of the "GET_TIMING_REQUIREMENTS" command by the responder 402 causes it to generate response time estimates based upon its performance capabilities. In one embodiment, the responder 402 may generate the response time estimates at least partially similar to how the responder 202 of FIG. 2 generated its response time estimates. For example, the responder 402 may generate a table 300, such as described above, and send the table 300 to the requester 404. Thereafter at step 414, the responder 402 sends the generated response time estimates to the requester 404.

At this point, the requester 404 now possesses apriori knowledge of the response time characteristics of the responder 402, and it can now make intelligent decisions about the timing of commands sent to the responder 402. For example, the requester 404 and responder 402 may process non-cryptographic-based commands as well as cryptographic-based commands in an at least partially similar manner to how the requester 204 and responder 202 performed steps 216-230 of FIG. 2 described herein above.

The SPDM timing requirements system 400 may be continued to process other commands sent from the requester 404 to the responder 402. Nevertheless, when use of the SPDM timing requirements system and method 400 are no longer needed or desired, the process ends.

Although FIGS. 2 and 4 describe example methods 200 and 400 that may be performed to advertise an estimated response time to a requester, the features of the methods 200 and 400 may be embodied in other specific forms without deviating from the spirit and scope of the present disclosure. For example, either of the methods 200 and 400 may perform additional, fewer, or different operations than those described in the present examples. For another example, either of the methods 200 and 400 may be performed in a sequence of steps different from that described above. As yet another example, certain steps of either of the methods 200 and 400 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a responder comprising a Security Protocol and Data Model (SPDM)-enabled device conforming to an SPDM specification, wherein the responder comprises at least one memory coupled to at least one processor, the at least one memory having program instructions stored thereon that, upon execution by the at least one processor, cause the responder to:
in response to a request from a requester, generate an estimated amount of time to process an SPDM command when received from the requester; and
send the estimated amount of time to the requester in response to the request,
wherein the requester is configured to wait the estimated amount of time between sending each of a plurality of the commands to the responder.

2. The IHS of claim 1, wherein the responder comprises an SPDM-enabled device configured in the IHS, and the requester comprises a Baseboard Management Controller (BMC) configured in the IHS.

3. The IHS of claim 1, wherein the acts of generating the estimated amount of time and sending the estimated amount of time to the requester are performed each time the SPDM-enabled device is re-booted.

4. The IHS of claim 1, wherein the estimated amount of time comprises a first estimated amount of time to process a non-cryptographic-based command, and a second estimated amount of time to process a cryptographic-based command.

5. The IHS of claim 1, wherein the program instructions, upon execution, further cause the responder to:
generate a plurality of estimated amounts of time to process a corresponding plurality of commands; and
send the plurality of estimated amounts of time to the requester, wherein each of the plurality of commands is different from one another.

6. The IHS of claim 1, wherein the estimated amount of time comprises an average estimated amount of time and a maximum amount of time to process the command.

7. The IHS of claim 1, wherein the program instructions, upon execution, further cause the responder to receive the request as a "GET_VERSION-CAPABILITIES-ALGORITHMS" SPDM command.

8. The IHS of claim 1, wherein the program instructions, upon execution, further cause the responder to receive the request as an SPDM command dedicated to obtaining estimated amount of time from the responder.

9. The IHS of claim 1, wherein the program instructions, upon execution, further cause the responder to:
detect that a computing load profile of the responder has changed;
perform the act of generating a new estimated amount of time again; and
sending the new estimated amount of time to the requester.

10. A Security Protocol and Data Model (SPDM) command timing requirement method comprising:
in response to a request from a requester, generating, by a responder, an estimated amount of time to process an SPDM command when received from the requester, wherein the responder and the requester operate according to the SPDM specification; and
sending, by the responder, the estimated amount of time to the requester in response to the request,
waiting, by the requester, the estimated amount of time between sending each of a plurality of the commands to the responder.

11. The SPDM command timing requirement method of claim 10, further comprising performing the acts of generating the estimated amount of time and sending the estimated amount of time to the requester each time the SPDM-enabled device is re-booted.

12. The SPDM command timing requirement method of claim 10, further comprising:
generating a plurality of estimated amounts of time to process a corresponding plurality of commands; and
sending the plurality of estimated amounts of time to the requester, wherein each of the plurality of commands is different from one another.

13. The SPDM command timing requirement method of claim 10, further comprising receiving the request as a "GET_VERSION-CAPABILITIES-ALGORITHMS" SPDM command.

14. The SPDM command timing requirement method of claim 10, further comprising receiving the request as an SPDM command dedicated to obtaining estimated amount of time from the responder.

15. The SPDM command timing requirement method of claim 10, further comprising:
detect that a computing load profile of the responder has changed;
perform the act of generating a new estimated amount of time again; and
sending the new estimated amount of time to the requester.

16. An Information Handling System (IHS) comprising:
a requester comprising a Security Protocol and Data Model (SPDM)-enabled device conforming to an SPDM specification, wherein the requester comprises at least one memory coupled to at least one processor, the at least one memory having program instructions stored thereon that, upon execution by the at least one processor, cause the requester to:
send a request to generate an estimated amount of time to process an SPDM command to a responder;
receive the estimated amount of time from the responder in response to the request; and
after sending the command to the responder, wait the estimated amount of time before sending each of a plurality of the commands to the responder.

17. The IHS of claim 16, wherein the responder comprises an SPDM-enabled device configured in the IHS, and the requester comprises a Baseboard Management Controller (BMC) configured in the IHS.

18. The IHS of claim 16, wherein the estimated amount of time comprises a first estimated amount of time to process a non-cryptographic-based command, and a second estimated amount of time to process a cryptographic-based command.

19. The IHS of claim 16, wherein the program instructions, upon execution, further cause the requester to send the request as a "GET_VERSION-CAPABILITIES-ALGORITHMS" SPDM command.

20. The IHS of claim 16, wherein the program instructions, upon execution, further cause the requester to send the request as an SPDM command dedicated to obtaining estimated amount of time from the responder.

* * * * *